United States Patent
Co et al.

(10) Patent No.: US 7,917,327 B2
(45) Date of Patent: *Mar. 29, 2011

(54) CHIP HANDLER WITH A BUFFER TRAVELING BETWEEN ROAMING AREAS FOR TWO NON-COLLIDING ROBOTIC ARMS

(75) Inventors: Ramon S. Co, Trabuco Canyon, CA (US); Tat Leung Lai, Torrance, CA (US); Calvin G. Leong, Irvine, CA (US)

(73) Assignee: Kingston Technology Corp., Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,777

(22) Filed: Jul. 7, 2010

(65) Prior Publication Data

US 2010/0274517 A1  Oct. 28, 2010

Related U.S. Application Data

(63) Continuation of application No. 11/944,614, filed on Nov. 24, 2007, now Pat. No. 7,783,447.

(51) Int. Cl.
*G06F 19/00* (2006.01)
*G06F 17/40* (2006.01)

(52) U.S. Cl. ......... 702/121; 221/1; 221/92; 700/213; 700/228; 700/230; 700/248; 702/108; 702/117; 702/187

(58) Field of Classification Search ...... 193/1; 209/509, 209/552; 221/1, 9, 68, 69, 76, 79, 87, 88, 221/92; 700/1, 90, 213, 214, 215, 225, 228, 700/230, 245, 247, 248, 249; 702/1, 108, 702/117, 118, 121, 127, 182, 187; 714/1, 25, 40, 42, 100; 901/50

See application file for complete search history.

(56) References Cited

U.S. PATENT DOCUMENTS

| 3,082,374 | A | * | 3/1963 | Buuck | 324/73.1 |
| 3,237,100 | A | * | 2/1966 | Chalfin et al. | 324/108 |
| 3,239,059 | A | * | 3/1966 | Cole, Jr. et al. | 209/573 |
| 3,239,060 | A | * | 3/1966 | Cole, Jr. et al. | 209/573 |
| 3,264,918 | A | * | 8/1966 | Lockart | 83/160 |
| 5,650,732 | A | * | 7/1997 | Sakai | 324/757.04 |
| 5,704,489 | A | * | 1/1998 | Smith | 209/2 |
| 6,008,636 | A | * | 12/1999 | Miller et al. | 324/757.01 |
| 6,184,675 | B1 | * | 2/2001 | Bannai | 324/750.03 |
| 6,239,396 | B1 | * | 5/2001 | Kang | 209/573 |
| 6,259,247 | B1 | * | 7/2001 | Bannai | 324/750.03 |
| 6,357,023 | B1 | * | 3/2002 | Co et al. | 714/42 |

(Continued)

*Primary Examiner* — Edward R Cosimano
(74) *Attorney, Agent, or Firm* — Stuart T. Auvinen; gPatent LLP

(57) ABSTRACT

Two robotic arms roam in separate, non-overlapping areas of a test station, avoiding collisions. A traveling buffer moves along x-tracks between a front position and a back position. In the front position, a first robotic arm loads IC chips from an input tray or stacker into buffer cavities in the traveling buffer. The traveling buffer then moves along the x-tracks to the back position, where a second robotic arm moves chips from the traveling buffer to test boards for testing. After testing, the second robotic arm moves chips to a second traveling buffer, which then moves along tracks to a front position for unloading by the first robotic arm. Two traveling buffers may move on the same tracks in a loop. The buffer cavities in the traveling buffer move on internal tracks to expand and contract spacing and pitch between the front and back positions to match test-board pitch.

22 Claims, 6 Drawing Sheets

U.S. PATENT DOCUMENTS

| | | | |
|---|---|---|---|
| 6,415,397 B1 * | 7/2002 | Co et al. | 714/42 |
| 6,493,607 B1 * | 12/2002 | Bourne et al. | 700/255 |
| 6,731,127 B2 * | 5/2004 | Watts | 324/757.04 |
| 6,882,141 B2 * | 4/2005 | Kim | 324/750.05 |
| 6,897,670 B2 * | 5/2005 | Burns | 324/750.02 |
| 6,919,718 B2 * | 7/2005 | Siade et al. | 324/757.05 |
| 6,924,636 B2 * | 8/2005 | Siade et al. | 324/756.02 |
| 7,509,532 B2 * | 3/2009 | Co et al. | 714/25 |
| 7,783,447 B2 * | 8/2010 | Co et al. | 702/121 |
| 2003/0117161 A1 * | 6/2003 | Burns | 324/765 |
| 2003/0117162 A1 * | 6/2003 | Watts | 324/765 |
| 2004/0078698 A1 * | 4/2004 | Co et al. | 714/42 |
| 2005/0057272 A1 * | 3/2005 | Park et al. | 324/765 |
| 2005/0062463 A1 * | 3/2005 | Kim | 324/158.1 |
| 2005/0099173 A1 * | 5/2005 | Siade et al. | 324/158.1 |
| 2005/0099174 A1 * | 5/2005 | Siade et al. | 324/158.1 |
| 2009/0138119 A1 * | 5/2009 | Co et al. | 700/121 |

* cited by examiner

US 7,917,327 B2

CHIP HANDLER WITH A BUFFER TRAVELING BETWEEN ROAMING AREAS FOR TWO NON-COLLIDING ROBOTIC ARMS

RELATED APPLICATION

This application is a continuation of U.S. Ser. No. 11/944,614, now U.S. Pat. No. 7,783,447 filed Nov. 24, 2007. This application may be related to U.S. Pat. No. 6,415,397 for "Automated Multi-PC-Motherboard Memory-Module Test System with Robotic Handler and In-Transit Visual Inspection" and U.S. Ser. No. 10/249,841 for "Robotic Memory-Module Tester Using Adapter Cards for Vertically Mounting PC Motherboards", now U.S. Pat. No. 7,509,532, having a common assignee and at least one inventor in common, but presenting patentably distinct claims.

FIELD OF THE INVENTION

This invention relates to robotic semiconductor test systems, and more particularly to movable chip-tray buffers for use with multiple robotic arms.

BACKGROUND OF THE INVENTION

Semiconductor integrated circuit (IC) chips are widely used in consumer electronics, telecommunications, and computer systems such as personal computers (PCs). A wide variety of semiconductor chips are made, including analog, system-on-a-chip, microprocessor, controllers, and memory. Perhaps the most widely made are dynamic random-access memory (DRAM) chips. DRAM memory chips are often mounted on small, removable memory modules. Older single-inline memory modules (SIMMs) have been replaced with dual-inline memory modules (DIMMs), 184-pin RIMMs (Rambus inline memory modules) and 184-pin DDR (double data rate) DIMMs. New kinds of memory modules continue to be introduced.

The memory industry is quite cost sensitive. Testing costs are significant, especially for higher-density chips and modules. Specialized, high-speed electronic test equipment is expensive, and the greater number of memory cells on high-speed memory chips increases the time spent on the tester, increasing test costs.

Rather than use an expensive general-purpose I.C. tester, inexpensive testers based on PC motherboards have been developed for memory modules. These motherboard-based testers cost only about $10K yet can replace a quarter-million-dollar I.C. tester when testing memory modules. The memory module to be tested is inserted into a test socket on a test adapter board (daughter card) mounted on the back-side of the motherboard. See "Connector Assembly for Testing Memory Modules from the Solder-Side of a PC Motherboard with Forced Hot Air", U.S. Ser. No. 09/702,017, now U.S. Pat. No. 6,357,023.

DRAM chips are first packaged and tested individually on test equipment such as automated test equipment (ATE) and then soldered to memory module. Then the memory module is tested on a module tester. Robotic testers that use many PC motherboards for memory modules have been developed by the current inventor. See Co et al., "Automated Multi-PC-Motherboard Memory-Module Test System with Robotic Handler and In-Transit Visual Inspection", U.S. Pat. No. 6,415,397.

While a variety of chip testers exist, further improvements are desirable. Higher throughput systems are desirable. However, simply increasing the number of test sockets may increase delays as robotic arms must travel longer distances. Adding more robotic arms can result in collisions among robotic arms, or in delays while one robotic arm waits for another robotic arm to get out of the way.

What is desired is a robotic tester for testing integrated circuit (IC) chips. A tester with multiple robotic arms is desired to increase test throughput. A tester with chip-tray buffers that move among roaming areas of each robotic arm is desirable.

DETAILED DESCRIPTION

The present invention relates to an improvement in multi-robotic-arm chip testers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
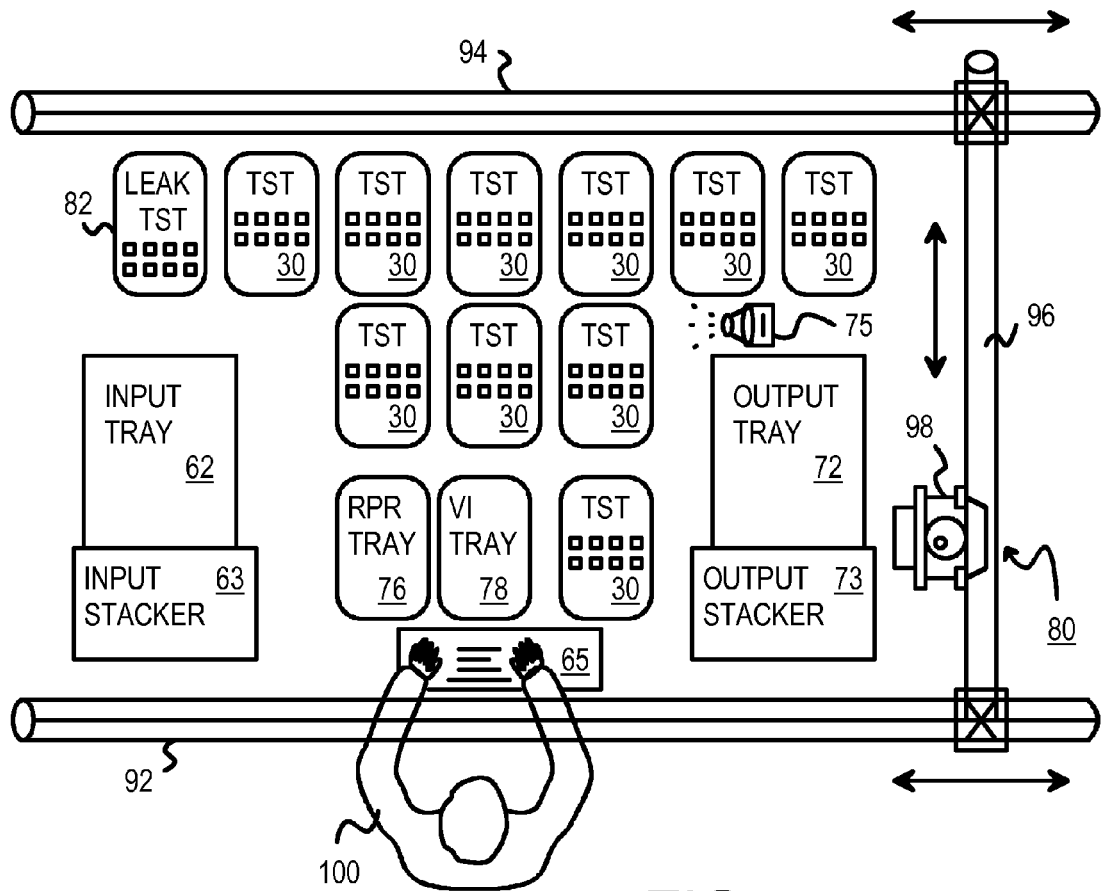
FIG. 1 is an overhead diagram looking down on a multi-board test station with overhead rails for an x-y-z robotic handler.

FIG. 1 is an overhead diagram looking down on a multi-board test station with overhead rails for an x-y-z robotic handler. Operator 100 can sit in front of the test station, controlling operation with a touch-screen or keyboard. Trays of untested memory IC chips such as DRAM chips can include a barcode that is scanned in to main system interface 65 by operator 100 before the tray is put into input stacker 63. Robotic handler 80 then picks untested DRAM chips that are moved over to input tray 62 by stacker 63.

The DRAM chips are first inserted into chip sockets on leakage tester 82. Passing DRAM chips are then moved by robotic handler 80 to the test sockets on one of test boards 30 for testing.

DRAM chips that fail testing at test board 30 or leakage test at leakage tester 82 are placed on repair tray 76 by robotic handler 80. DRAM chips passing the tests by test board 30 are pulled from the test socket by robotic handler 80 and optionally moved in front of cameras 75 for visual inspection. DRAM chips failing visual inspection are dropped into VI tray 78. Passing DRAM chips are placed on output tray 72 and full trays are moved by stacker 73 to the front of the test station where operator 100 can remove them.

Each of test board 30 has several test sockets and is a test station that is able to test several DRAM chips simultaneously. Each test board 30 fits into a well in the frame of the test station. The test station has a surface at about bench-top level composed of the exposed solder sides of test boards 30 in the wells in the frame. Various chips, cables, and components may exist underneath test boards 30, such as interfaces to ATE. Test boards 30 could also connect to memory buses of PC motherboards or testers based on memory controllers or advanced memory buffers that are hidden underneath.

Robotic handler 80 rides on rails 92, 94 mounted above the level of test boards 30, such as above the head of a seated operator 100. Operator 100 also replaces repair tray 76 and VI tray 78 with empty trays when full.

Fixed rails 92, 94 in the x direction allow movable y-rail 96 to travel in the x direction. Robot arm assembly 98 then travels in the y direction along y-rail 96 until robot arm assembly 98 is directly over the desired position, such as a test socket on one of test boards 30, or an input or output tray. An elevator arm on robot arm assembly 98 then moves up and down, pulling out (up) a DRAM chip or inserting a DRAM chip into (down) a test socket or tray. Robot arm assembly 98 can also rotate or spin the DRAM chip into the desired position.

Figure 2:
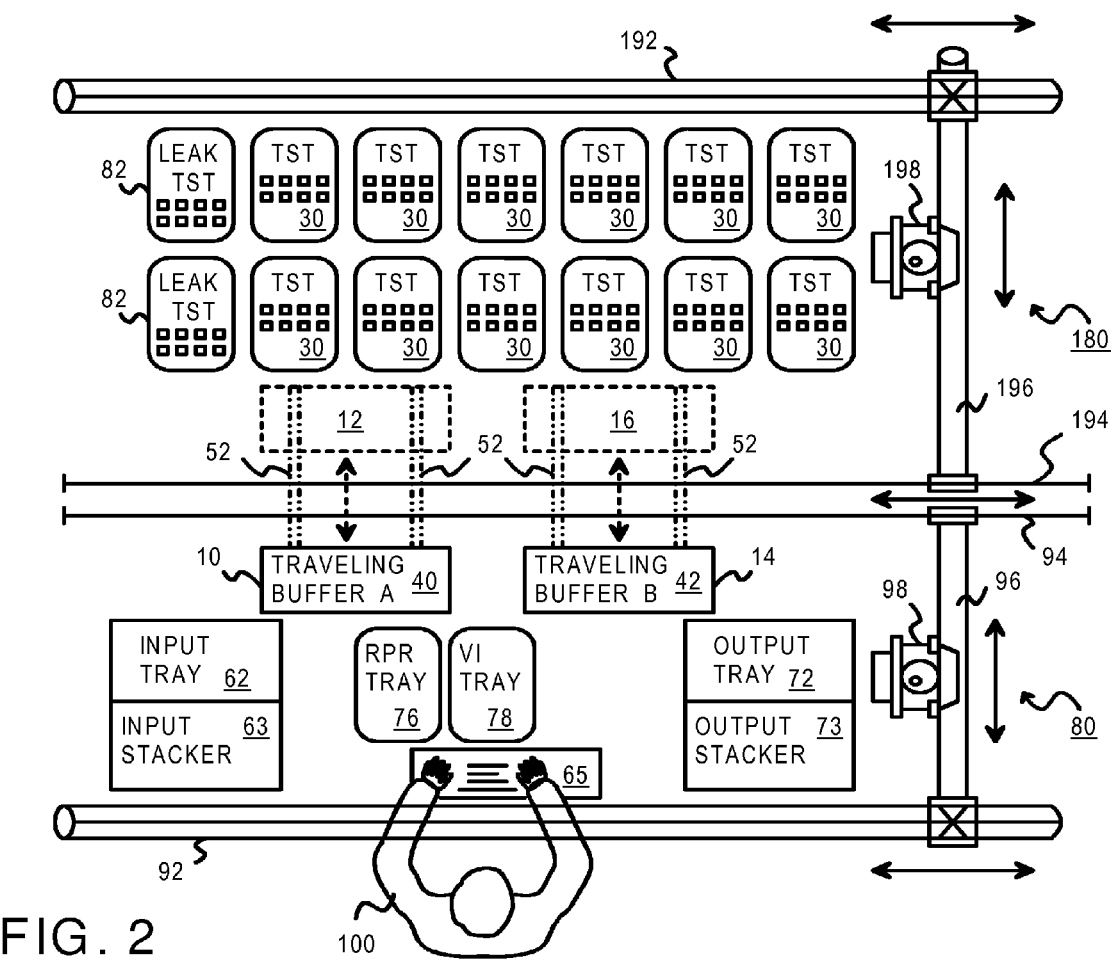
FIG. 2 is an overhead diagram of a test station with traveling buffers and overhead rails for two x-y-z robotic handlers.

FIG. 2 is an overhead diagram of a test station with traveling buffers and overhead rails for two x-y-z robotic handlers. Rather than have a single robotic arm, two robotic handlers 80, 180, are provided.

First robotic handler 80 includes robot arm assembly 98 which travels in the y direction along y-rail 96, and in the x-direction on rails 92, 94 mounted above the level of test boards 30. First robotic handler 80 can be positioned above input tray 62 by stacker 63, output tray 72 by stacker 73, repair tray 76, or VI tray 78, but cannot reach test boards 30 or leakage testers 82.

Second robotic handler 180 includes robot arm assembly 198 which travels in the y direction along y-rail 196, and in the x-direction on rails 192, 194 mounted above the level of test boards 30. Second robotic handler 180 can be positioned above test boards 30 or leakage testers 82, but cannot reach input tray 62 by stacker 63, output tray 72 by stacker 73, repair tray 76, or VI tray 78.

First robotic handler 80 and second robotic handler 180 are non-overlapping, having separate roaming areas. Collisions between first robot arm assembly 98 and second robot arm assembly 198 are impossible since their area of movement, or roaming areas, are non-overlapping.

While having two robotic arms with non-overlapping roaming areas is beneficial since collisions and delays waiting for the other arm to pass by are eliminated, the lack of an overlapping area prevents one arm from directly passing DRAM chips to the other arm. Instead, traveling buffers 40, 42 are provided for transferring DRAM chips between the two roaming areas.

Traveling buffer 40 travels on tracks 52 between two positions 10, 12. Traveling buffer 42 travels on tracks 52 between two positions 14, 16. Positions 10, 14 are accessible by first robotic handler 80, while positions 12, 16 are accessible by second robotic handler 180.

First robotic handler 80 can pick up DRAM chips from input tray 62 and move the DRAM chips to position 10, where the DRAM chips are loaded onto traveling buffer 40. Traveling buffer 40 then moves from position 10 into position 12. Then second robotic handler 180 picks up DRAM chips from traveling buffer 40 in position 12, and moves these DRAM chips to leakage tester 82, and then on to test board 30.

After testing by test board 30, DRAM chips are picked up by second robotic handler 180, moved to position 16, and placed into traveling buffer 42. Traveling buffer 42 then moves from position 16 to position 14. Then first robotic handler 80 picks up the DRAM chips from traveling buffer 42 at position 14, and places passing DRAM chips into output tray 72, and failing DRAM chips into repair tray 76.

Second robotic handler 180 may pick up only passing DRAM chips from test boards 30 for transfer together in a group to traveling buffer 42. Later, second robotic handler 180 can pick up failing DRAM chips and place them together in traveling buffer 42 for transfer to repair tray 76. Alternately, passing and failing DRAM chips may be mixed together on traveling buffer 42, and the system keeps track of which DRAM chips in which locations on traveling buffer 42 are passing, and which are failing.

Figure 3A:
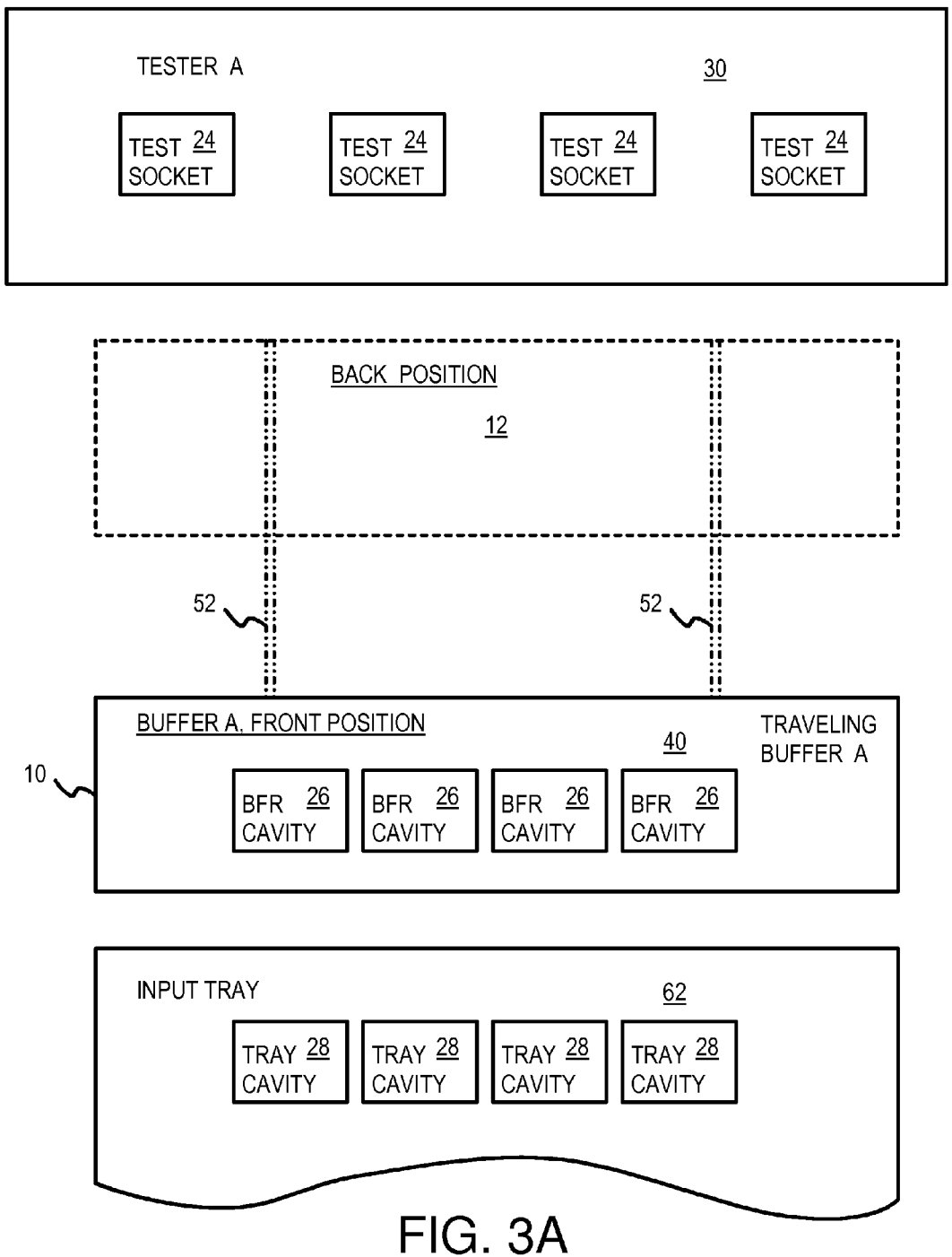
FIGS. 3A-3B show the traveling buffer in two positions.
Figure 3B:
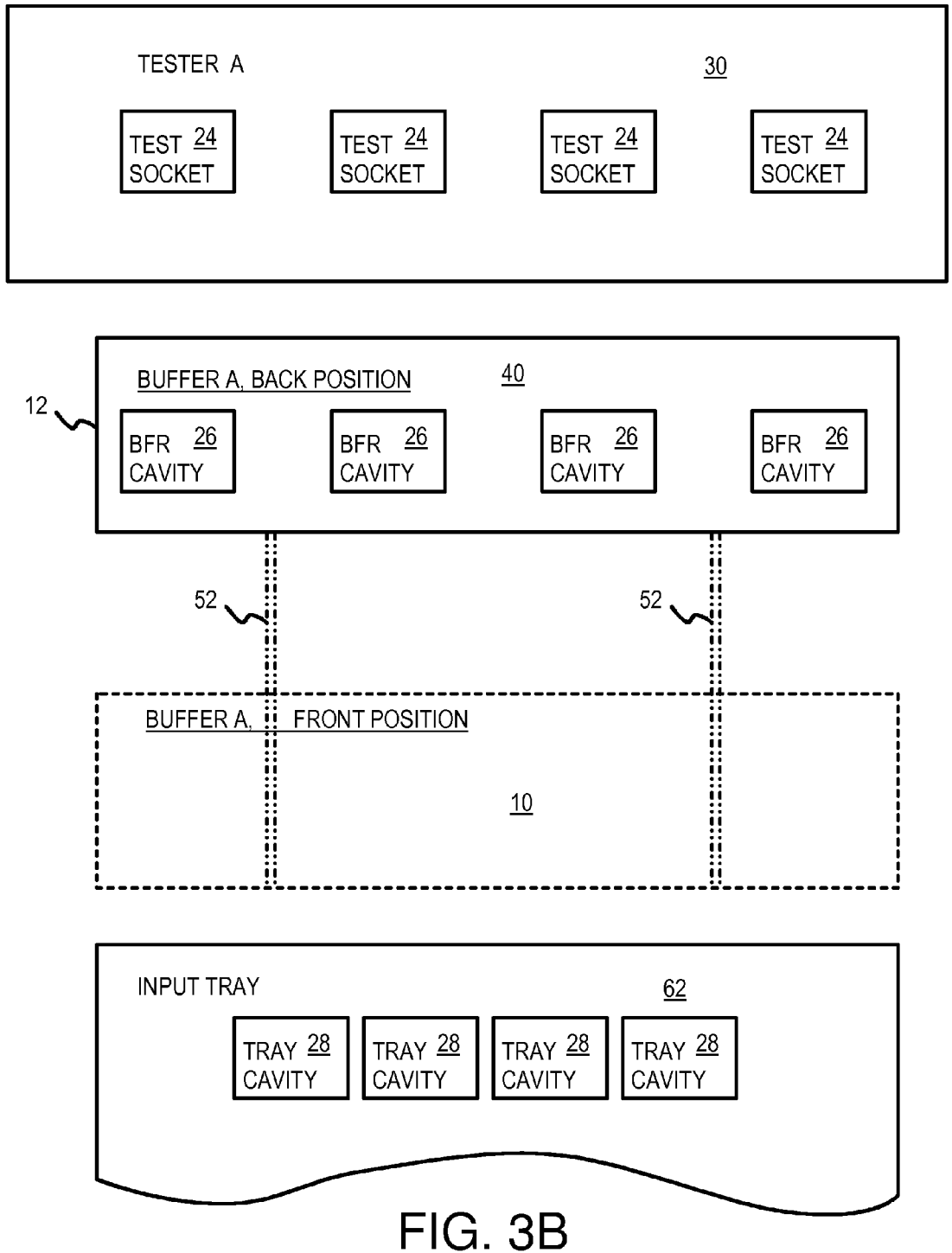

FIGS. 3A-3B show the traveling buffer in two positions. Traveling buffer 40 has several buffer cavities 26 that can each accept one DRAM chip. Traveling buffer 40 travels on tracks 52 between front position 10, which is accessible by first robotic handler 80 but not by second robotic handler 180, and back position 12, which is accessible by second robotic handler 180 but not by first robotic handler 80. Front position 10 is closer to operator 100 than back position 12.

In FIG. 3A, traveling buffer 40 is in front position 10. First robotic handler 80 picks up DRAM chips in tray cavities 28 on input tray 62, moves them over traveling buffer 40, and lowers the DRAM chips into buffer cavities 26. The pitch of buffer cavities 26 matches that of tray cavities 28 when traveling buffer 40 is in front position 10.

In FIG. 3B, traveling buffer 40 has moved from front position 10 to back position 12. Buffer cavities 26 have moved apart from one another within traveling buffer 40 to increase the pitch of buffer cavities 26. The expanded pitch of buffer cavities 26 in back position 12 matches the pitch of test sockets 24 on test board 30.

Second robotic handler 180 picks up the DRAM chips in buffer cavities 26 on traveling buffer 40, moves the DRAM chips over test sockets 24 on test board 30, and lowers the DRAM chips into test sockets 24. The DRAM chips are then tested by test board 30. The DRAM chips could also first be tested by leakage tester 82 before being transferred to test board 30. Test sockets on leakage tester 82 may also have the same expanded pitch of test sockets 24 on test board 30.

Figure 4:
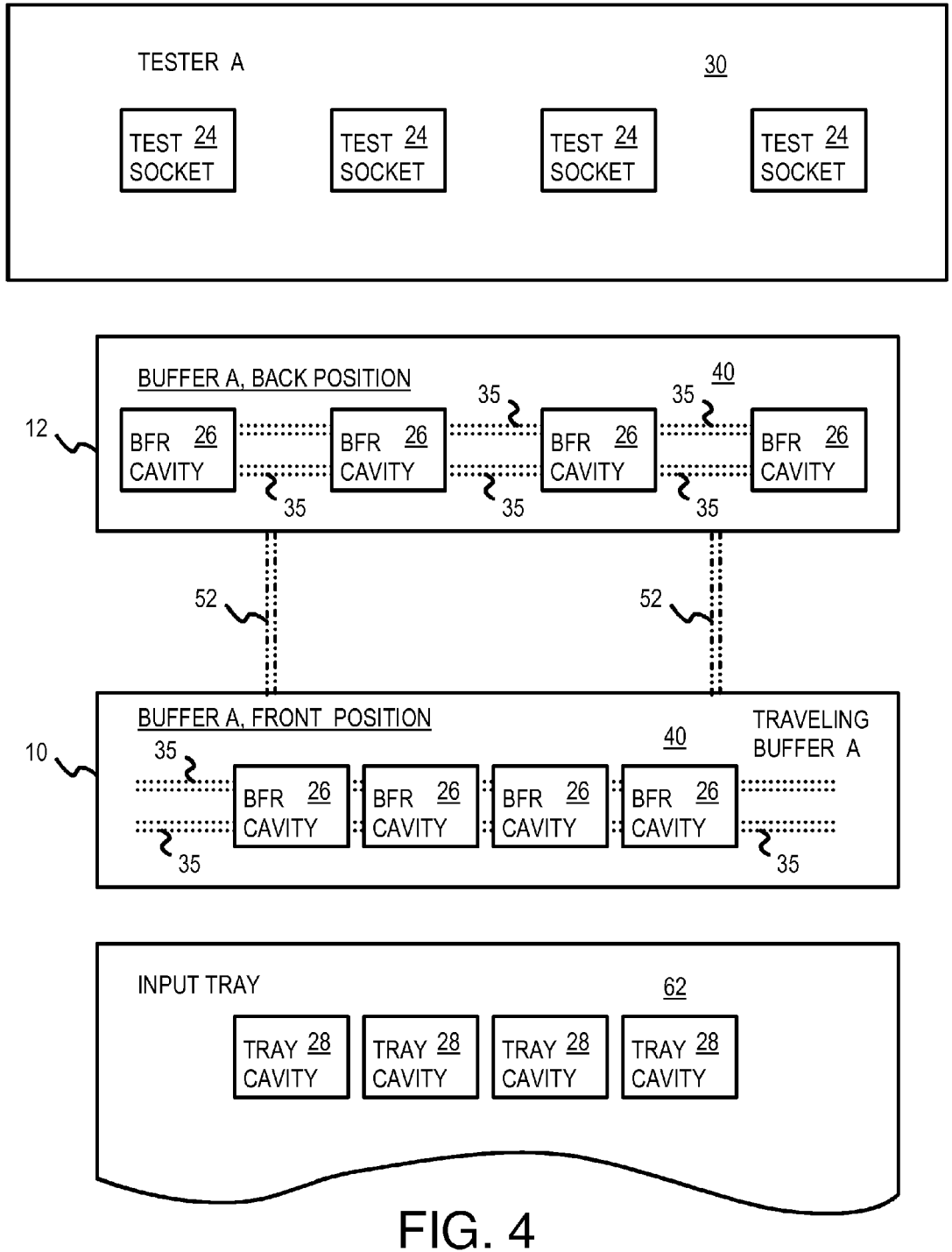
FIG. 4 highlights expansion of the DRAM-chip pitch on the traveling buffer.

FIG. 4 highlights expansion of the DRAM-chip pitch on the traveling buffer. Buffer cavities 26 move on internal tracks 35 within traveling buffer 40. Traveling buffer 40 itself moves over tracks 52 between positions 10, 12.

When traveling buffer 40 is in front position 10, buffer cavities 26 move on internal tracks 35 toward the center of traveling buffer 40, decreasing their pitch and spacing. When traveling buffer 40 is in back position 12, buffer cavities 26 move on internal tracks 35 away from the center of traveling buffer 40, increasing their pitch and spacing. Small gears, levers, or linkages may be used to move buffer cavities 26 along internal tracks 35 as traveling buffer 40 moves along tracks 52.

Matching pitch to test board 30 or input tray 62 allows for a simpler robotic arm to be used. First robot arm assembly 98 can have a fixed pitch between fingers that pick up DRAM chips that matches the pitch of input tray 62 and output tray 72. Second robot arm assembly 198 can have a wider, fixed pitch between fingers that pick up DRAM chips that matches the pitch of test board 30 and leakage tester 82. Since robot arm assembly 98, 198 each have a fixed pitch, extra mechanisms to spread the finger pitch apart are not needed. Their fingers do not have to spread apart when carrying DRAM chips since the pitches are matched.

Figure 5:
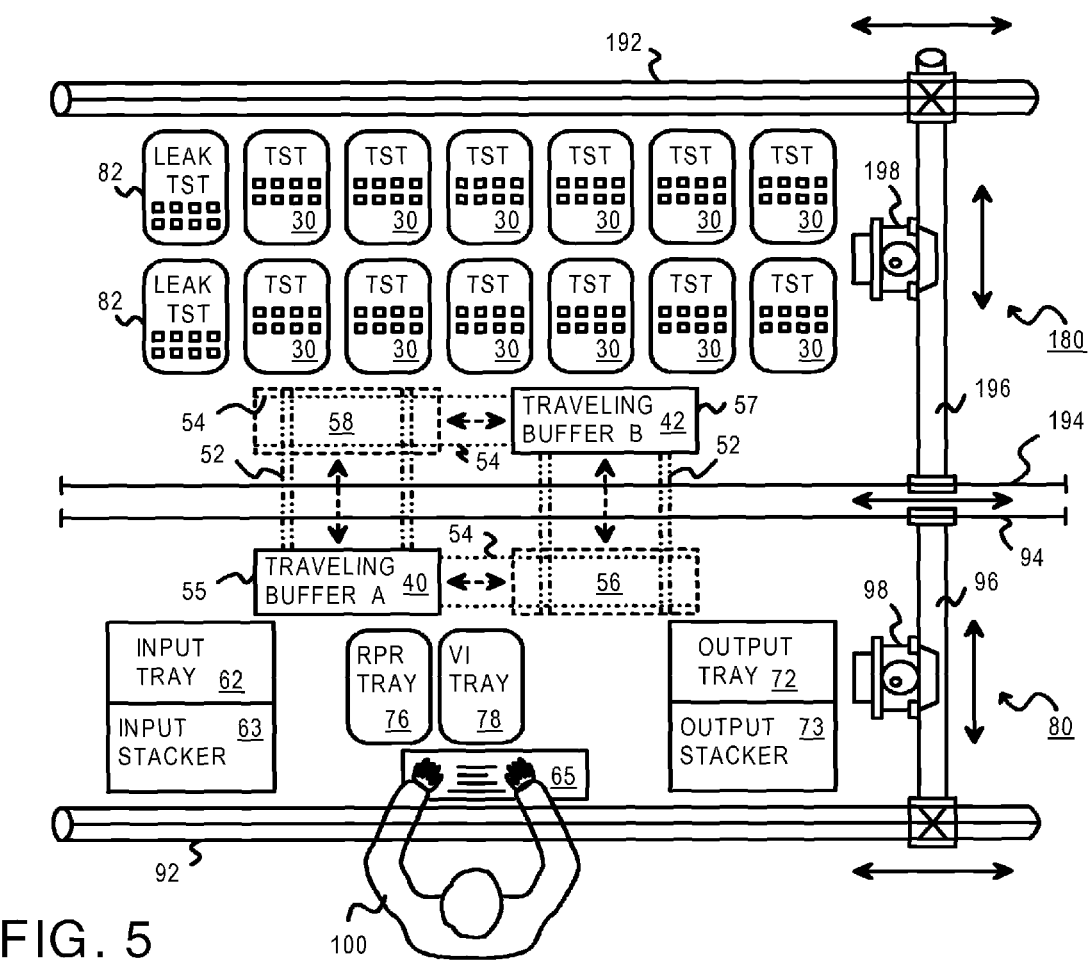
FIG. 5 is an overhead diagram of a dual-robotic-arm test station with traveling buffers that travel in a 2-dimensional loop.

FIG. 5 is an overhead diagram of a dual-robotic-arm test station with traveling buffers that travel in a 2-dimensional loop. Two robotic handlers 80, 180, and two traveling buffers 40, 42 are provided as described earlier for FIG. 2. However, first traveling buffer 40 can travel in a loop among four positions 55, 58, 57, 56. Second traveling buffer 42 also travels in a loop among the same four positions 55, 58, 57, 56.

First traveling buffer 40 can travel in the y direction along y-tracks 52 between front position 55 and back position 58. When in back position 58, first traveling buffer 40 can also travel along x-tracks 54 between back position 58 and back position 57. Since only one of traveling buffers 40, 42 can occupy any one position at any point in time, second traveling buffer 42 must move out of back position 57 to front position 56 before first traveling buffer 40 can move into back position 57.

Second traveling buffer 42 can then move along x-tracks 54 from front position 56 to front position 55, allowing first traveling buffer 40 to move along y-tracks 52 from back position 57 to front position 56.

Traveling buffers 40, 42 can follow each other in a loop through positions 55, 58, 57, 56, in either the clockwise or the counter-clockwise direction. Having 2 directions of movement allows traveling buffers 40, 42 to be more versatile, and can increase tester efficiency. For example, second robot arm assembly 198 can be loading untested DRAM chips from traveling buffer 40 in back position 58 to leakage tester 82, while also moving tested DRAM chips from test board 30 to traveling buffer 42 in back position 57. Robotic arm movements can be reduced somewhat by both unloading traveling buffer 40 and loading traveling buffer 42 at about the same time.

First robotic handler 80 and second robotic handler 180 are still non-overlapping, having separate roaming areas. Collisions between first robot arm assembly 98 and second robot arm assembly 198 are impossible since their area of movement, or roaming areas, are non-overlapping. Traveling buffers 40, 42 transfer DRAM chips between the two roaming areas.

Traveling buffer 40 travels on tracks 52, 54 in a loop among four positions 55, 58, 57, 56. Traveling buffer 42 also travels on tracks 52, 54 in a loop among the same four positions 55, 58, 57, 56. Front positions 55, 56 are accessible by first robotic handler 80, while back positions 57, 58 are accessible by second robotic handler 180.

First robotic handler 80 can pick up DRAM chips from input tray 62 and move the DRAM chips to front position 55, where the DRAM chips are loaded onto first traveling buffer 40. After testing by test board 30, other DRAM chips are picked up by second robotic handler 180, moved to back position 57, and placed into second traveling buffer 42.

After traveling buffer 40 is full, traveling buffer 40 moves along y-tracks 52 from front position 55 to back position 58. Then second robotic handler 180 picks up DRAM chips from traveling buffer 40 in back position 58, and moves these DRAM chips to leakage tester 82, and then on to test board 30.

Once second traveling buffer 42 is full, traveling buffer 42 moves from back position 57 to front position 56 along y-tracks 52. Then first robotic handler 80 picks up the DRAM chips from second traveling buffer 42 at front position 56, and places passing DRAM chips into output tray 72, and failing DRAM chips into repair tray 76.

The empty second traveling buffer 42 moves from front position 56 to front position 55. First robotic handler 80 can pick up more DRAM chips from input tray 62 and move the DRAM chips to front position 55, where the DRAM chips are loaded onto second traveling buffer 42.

Once first traveling buffer 40 is empty, traveling buffer 40 moves along x-tracks 54 from back position 58 to back position 57. After testing by test board 30, other DRAM chips are picked up by second robotic handler 180, moved to back position 57, and placed into first traveling buffer 40.

Once first traveling buffer 40 is full, traveling buffer 40 moves from back position 57 to front position 56 along y-tracks 52. Then first robotic handler 80 picks up the DRAM chips from first traveling buffer 40 at front position 56, and places passing DRAM chips into output tray 72, and failing DRAM chips into repair tray 76.

Traveling buffers 40, 42 continue to loop through positions 55, 58, 57, 56, being loaded in positions 55, 57 and unloaded in positions 58, 56.

Alternate Embodiments

Several other embodiments are contemplated by the inventors. For example, while testing DRAM chips has been described, other kinds of chips may be tested. Rather than have two robotic arms and two roaming areas, more robotic arms and roaming areas may be included. Multiple buffers and trays may be used, and input and output trays (including repair and VI trays) may be stacked vertically in a stacker unit. A tray-exchange unit may be used to minimize operator intervention and down time of the tester. Many kinds of outgoing trays may be used, such as for different speed grades, or different kinds of failures.

Buffers may have multiple rows of chips rather than just one row. Robotic arms may pick up just one chip at a time, or multiple chips at a time, a row of chips at a time, or multiple rows at a time. Buffers may move in more complex paths such as curves.

A third traveling buffer could be added to traveling buffers 40, 42 of FIG. 5. Then three traveling buffers travel in the loop among the four positions 55, 58, 57, 56. Rather than use physical tracks 52, 54 in FIG. 5 for moving buffers in a loop, the looping track may be a rotating structure such as a disk, a wheel or a propeller.

The same buffer may be used for ferrying back tested chips from the tester to the output tray instead of using a separate dedicated buffer. Alternatively, two separate buffers may be used that are dedicated for ferrying back tested chips, with one buffer containing passing chips and the other buffer containing failing chips.

For example the number of test sockets on the test boards could vary, and additional components could be added to the test boards. Different mounting mechanisms and electrical connections could be substituted. A second board such as a PC motherboard may be mounted under test board 30 and substantially perpendicular to the test board by being at an angle such as from 60 to 120 degrees rather than exactly 90 degrees.

Local heaters for heating the DRAM chips being tested could be mounted on the chassis near the test boards or on a metal plate that holds the test boards. A fiberglass board or other insulation that better insulates test board 30 from the elevated temperatures near test board 30 can also be used. A local cooling gun or compressed air rather than a local heater could be substituted to cool the test chamber and the DRAM chips under test.

Many kinds of memory chips can be tested. Standard DRAM or newer EDO and synchronous DRAM can be tested, as can SRAM, flash memory, logic chips, and system chips. The system is ideally suited for testing the highest-speed memory chips, since capacitive loading is minimized.

A Yamaichi type connector could be used as the test socket, but a production-quality connector/socket is preferred due to the low insertion force required. A production quality connector/socket can take more insertions (greater than 100,000 times) than conventional sockets (rated for 100 insertions). A production socket also has an ejector normally located at the edges of the socket. This alleviates the ejection of DRAM chips for manual as well as robotic handling. A production socket may also contain a V-shape groove. A handler or a robotic arm can drop the DRAM chip to the V-shape entry, let it settle, and then push the chip from the top to the socket. The V shape entry can lower the accuracy requirement to the handler or robotic arm for insertion of the DRAM chip.

A variety of technologies can be used for the robotic arm. A swinging or pivoting arm can be used, with perhaps a telescoping arm extension and a vertical servo at the end of the arm. Alternately, an x-y-z track system can be used. Many variations of automatic tray stacker or elevator systems are known and can be employed. The test program can initially pause after insertion of a new memory chip to allow it to be warmed up by the hot air. Memory chips could also be preheated by blowing hot air onto chips waiting to be inserted and tested. The input tray could be heated to accomplish this.

One operator may be able to operate several test stations, depending on how quickly trays need to be inserted and removed. A network controller card on the ISA or PCI bus that communicates with the main system interface can be adapted for other buses and is not limited to existing buses. The controller card can be replaced by a standard parallel or serial-port interface to the main system interface. FireWire, USB, or other emerging standards can be used for the interfaces. Many kinds of robotic arms and tracking systems can be employed, with different degrees of motion. Different grasping technologies can be used to hold the memory chips in the robotic arm. Multiple robotic arms that operate in tandem or independently can be used with the test station.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dual-robotic parallel test system for testing semiconductor chips comprising:
    test boards, each having a test socket for receiving a semiconductor chip for testing by the test boards, each test board for electrically connecting a semiconductor chip inserted into the test socket;
    a main system interface, coupled to the plurality of test boards, for commanding the test boards to test semiconductor chips inserted into test sockets and for receiving test results from the test boards;
    a traveling buffer having buffer cavities for receiving semiconductor chips, the traveling buffer movable between a front position in a front roaming area and a back position in a back roaming area;
    a back robotic arm, movable within the back roaming area and responsive to commands from the main system interface, for inserting and removing semiconductor chips into the test sockets on the test boards and for inserting and removing semiconductor chips from the buffer cavities on the traveling buffer when traveling buffer is in the back position within the back roaming area;
    a front robotic arm, movable within the front roaming area and responsive to commands from the main system interface, for inserting and removing semiconductor chips from the buffer cavities on the traveling buffer when the traveling buffer is in the front position within the front roaming area;
    an input tray, within the front roaming area, for holding untested semiconductor chips, the front robotic arm picking a semiconductor chip from the input tray and inserting the semiconductor chip into the traveling buffer; and
    an output tray, within the front roaming area, for holding tested semiconductor chips.

2. The dual-robotic parallel test system of claim 1 further comprising:
    internal tracks on the traveling buffer that move the buffer cavities to adjust a spacing between the buffer cavities;
    wherein the spacing is larger when the traveling buffer is in the back position than when the traveling buffer is in the front position,
    whereby the traveling buffer enlarges spacing for insertion into the test boards and reduces spacing for insertion into the output tray.

3. The dual-robotic parallel test system of claim 2 wherein the main system interface commands the front robotic arm to remove semiconductor chips from the input tray and place the semiconductor chips in the buffer cavities in the traveling buffer in the front position;
    wherein the main system interface commands the traveling buffer in the front position to move to the back position when the buffer cavities contain untested semiconductor chips;
    wherein the main system interface commands the back robotic arm to remove semiconductor chips from the traveling buffer in the back position and place the semiconductor chips in the test sockets on the test boards, and after testing commands the back robotic arm to remove semiconductor chips from the test sockets on the test boards, and place the semiconductor chips in the traveling buffer in the back position;

wherein the main system interface commands the traveling buffer in the back position to move to the front position when the buffer cavities contain tested semiconductor chips;

wherein the main system interface commands the front robotic arm to remove semiconductor chips from the buffer cavities in the traveling buffer in the front position and place the semiconductor chips in the output tray, whereby the traveling buffer moves semiconductor chips between the front and back roaming areas for access by the front and back robotic arms.

4. The dual-robotic parallel test system of claim 3 further comprising:

a loop track allowing the traveling buffer to move in two dimensions between the front position and the back position;

wherein the traveling buffer comprises a pair of traveling buffers traveling in a loop on the loop track between the front roaming area and the back roaming area;

wherein the loop track is a physical track or a rotating structure.

5. The dual-robotic parallel test system of claim 4 wherein the front position comprises a pair of positions able to hold both of the pair of traveling buffers simultaneously;

wherein the back position comprises a pair of positions able to hold both of the pair of traveling buffers simultaneously.

6. The dual-robotic parallel test system of claim 3 wherein the back robotic arm is attached to a back robotic arm assembly that travels in a length direction on a g-rail, and travels in a width direction on an x-rail, the back robotic arm moving the semiconductor chip up and down to remove and insert the semiconductor chip from the test socket;

whereby the back robotic arm is an x-y-z tracked robotic system;

wherein the test boards are connected to personal computer PC main boards.

7. The dual-robotic parallel test system of claim 6 wherein the test boards comprise functional test boards and leakage test boards;

wherein the leakage test boards are for performing leakage tests on semiconductor chips before the back robotic arm moves the semiconductor chips to the functional test boards for functional testing, whereby leakage testing is performed before functional testing.

8. A semiconductor-chip tester comprising:

a traveling buffer for moving semiconductor chips between a first roaming area and a second roaming area;

a first robotic device that moves semiconductor chips before testing from an input stack of untested semiconductor chips to the traveling buffer, and moves semiconductor chips after testing from the traveling buffer to an output stack of tested semiconductor chips;

wherein the first robotic device moves within the first roaming area;

a second robotic device that moves semiconductor chips before testing from the traveling buffer to a test socket, and moves semiconductor chips after testing from the test socket to the traveling buffer;

wherein the second robotic device moves within the second roaming area;

a host computer for controlling the first robotic device and the second robotic device;

a plurality of test stations for testing semiconductor chips that are loaded and unloaded by the second robotic device, each test station comprising:

a test board; and a test socket mounted on the test board, the test socket for receiving a semiconductor chip inserted by the second robotic device;

wherein the test board executes a test program in response to commands from the host computer, the test program testing the semiconductor chip inserted into the test socket;

whereby the traveling buffer moves semiconductor chips between the first roaming area of the first robotic device and the second roaming area of the second robotic device.

9. The semiconductor-chip tester of claim 8 wherein the traveling buffer further comprises:

a first traveling buffer chip-tray having buffer cavities for accepting semiconductor chips;

a second traveling buffer chip-tray having buffer cavities for accepting semiconductor chips;

a looping track that allows the first traveling buffer chip-tray to move in a loop between the first roaming area and the second roaming area, and allows the second traveling buffer chip-tray to move in the loop between the first roaming area and the second roaming area;

wherein the looping track is a physical track or a rotating structure, whereby two traveling buffers travel in the loop between the first roaming area and the second roaming area.

10. The semiconductor-chip tester of claim 8 wherein the traveling buffer further comprises:

a first traveling buffer chip-tray having buffer cavities for accepting semiconductor chips;

a second traveling buffer chip-tray having buffer cavities for accepting semiconductor chips;

a first track that allows the first traveling buffer chip-tray to move linearly between the first roaming area and the second roaming area; and a second track that allows the second traveling buffer chip-tray to move linearly between the first roaming area and the second roaming area.

11. The semiconductor-chip tester of claim 10 further comprising:

first internal tracks on the first traveling buffer chip-tray that move the buffer cavities within the first traveling buffer chip-tray to adjust a spacing between semiconductor chips inserted into the buffer cavities;

second internal tracks on the second traveling buffer chip-tray that move the buffer cavities within the second traveling buffer chip-tray to adjust the spacing between semiconductor chips inserted into the buffer cavities;

wherein the spacing is adjusted to a tight spacing when the first traveling buffer chip-tray is in the first roaming area, and adjusted to a wider spacing than the tight spacing when the first traveling buffer chip-tray is in the second roaming area;

wherein the spacing is adjusted to the tight spacing when the second traveling buffer chip-tray is in the first roaming area, and adjusted to the wider spacing than the tight spacing when the second traveling buffer chip-tray is in the second roaming area, whereby semiconductor-chip spacing is adjusted between roaming areas by the traveling buffer.

12. A dual-zone robotic multiple-test-board semiconductor tester comprising:

main system means for controlling testing of semiconductor chips on multiple test boards;
a plurality of testing means for testing semiconductor chips, each testing means comprising:
test socket means for receiving a semiconductor chip for testing;
test board means, controlled by the main system means, for executing a test program to test a semiconductor chip inserted into the test socket means;
input buffer means for storing semiconductor chips before testing by the test board means;
output buffer means for storing semiconductor chips after testing by the test board means;
traveling buffer means for moving semiconductor chips between a first roaming area and a second roaming area;
first robotic means, controlled by the main system means to move within the first roaming area, for grasping a semiconductor chip from the input buffer means and moving the semiconductor chip to and inserting the semiconductor chip in the traveling buffer means, and for grasping the semiconductor chip from the traveling buffer means and moving the semiconductor chip to and inserting the semiconductor chip in the output buffer means; and
second robotic means, controlled by the main system means to move within the second roaming area, for grasping a semiconductor chip and inserting the semiconductor chip into the test socket means, the second robotic means also for grasping and removing the semiconductor chip from the test socket means after completion of the test program, and moving the semiconductor chip to the traveling buffer means when the test board means indicates to the main system means that the semiconductor chip has passed the test program;
wherein the dual-zone robotic multiple-test-board semiconductor tester has a plurality of the test board means, each test board means for executing the test program on a different semiconductor chip in parallel with other test board means,
whereby parallel testing of semiconductor chips is performed by the test board means.

13. The dual-zone robotic multiple-test-board semiconductor tester of claim 12 wherein the first roaming area and the second roaming area are non-overlapping areas.

14. The dual-zone robotic multiple-test-board semiconductor tester of claim 13 wherein the first robotic means further comprises:
first multi-chip means for grasping, moving, and inserting a gang of multiple semiconductor chips that are moved together simultaneously;
wherein the second robotic means further comprises:
second multi-chip means for grasping, moving, and inserting a gang of multiple semiconductor chips that are moved together simultaneously,
whereby multiple semiconductor chips are moved together by robotic arms.

15. The dual-zone robotic multiple-test-board semiconductor tester of claim 14 wherein the traveling buffer means further comprises a plurality of buffer cavity means for accepting the semiconductor chips.

16. The dual-zone robotic multiple-test-board semiconductor tester of claim 15 wherein the traveling buffer means further comprises:
internal track means for moving the plurality of buffer cavity means to increase and decrease a pitch between semiconductor chips inserted into the plurality of buffer cavity means,
whereby semiconductor-chip pitch is adjusted by the traveling buffer means.

17. The dual-zone robotic multiple-test-board semiconductor tester of claim 16 wherein each test board means comprises a plurality of the test socket means, each test board means for testing a plurality of the semiconductor chips inserted into the plurality of test socket means on the test board means.

18. The dual-zone robotic multiple-test-board semiconductor tester of claim 17 wherein the input buffer means stores semiconductor chips arranged with a first pitch;
wherein the output buffer means stores semiconductor chips arranged with the first pitch;
wherein the test socket means on the test board means tests inserted semiconductor chips arranged with a second pitch;
wherein the second pitch is larger than the first pitch,
wherein the internal track means on the traveling buffer means adjusts semiconductor-chip pitch between the first pitch and the second pitch.

19. The dual-zone robotic multiple-test-board semiconductor tester of claim 18 wherein the internal track means on the traveling buffer means increases semiconductor-chip pitch from the first pitch to the second pitch when the traveling buffer means moves from the first roaming area to the second roaming area;
wherein the internal track means on the traveling buffer means decreases semiconductor-chip pitch from the second pitch to the first pitch when the traveling buffer means moves from the second roaming area to the first roaming area,
whereby semiconductor-chip pitch is adjusted when the traveling buffer means moves between roaming areas of robotic arms.

20. The dual-zone robotic multiple-test-board semiconductor tester of claim 16 further comprising:
second traveling buffer means for moving semiconductor chips between the first roaming area and the second roaming area,
whereby two traveling buffers are used between roaming areas of robotic arms.

21. The dual-zone robotic multiple-test-board semiconductor tester of claim 20 further comprising:
first track means for moving the traveling buffer means between the first roaming area and the second roaming area; and
second track means for moving the second traveling buffer means between the first roaming area and the second roaming area.

22. The dual-zone robotic multiple-test-board semiconductor tester of claim 21 further comprising:
loop track means for connecting the first track means to the second track means to permit movement of the traveling buffer means on both the first track means and on the second track means, and to permit movement of the second traveling buffer means on both the first track means and on the second track means,
whereby the traveling buffer means and the second traveling buffer means travel in a loop among the first track means and the second track means and the loop track means.

* * * * *